United States Patent [19]
Yang

[11] Patent Number: 5,719,990
[45] Date of Patent: Feb. 17, 1998

[54] HOT WATER AND ELECTRICITY GENERATOR

[76] Inventor: Tsai Hui Yang, P.O. Box 82-144, Taipei, Taiwan

[21] Appl. No.: 618,516

[22] Filed: Mar. 19, 1996

[51] Int. Cl.$^6$ .................... F24H 1/18; F24F 3/14; B60L 1/02
[52] U.S. Cl. ............... 392/400; 290/2; 392/401; 392/402
[58] Field of Search .................... 392/400, 401, 392/402, 403; 122/13.2; 290/2; 237/12.3 C; 222/146.5

[56] References Cited

U.S. PATENT DOCUMENTS

| | | | |
|---|---|---|---|
| 4,226,214 | 10/1980 | Palazzetti | 290/2 |
| 4,239,956 | 12/1980 | Morton | 392/402 |
| 4,339,307 | 7/1982 | Ellis, Jr. | 392/402 |
| 4,503,337 | 3/1985 | Hafner et al. | 290/2 |
| 4,657,290 | 4/1987 | Linden | 290/2 |
| 4,697,735 | 10/1987 | Temple | 392/402 |
| 4,736,111 | 4/1988 | Linden | 290/2 |

*Primary Examiner*—Teresa J. Walberg
*Assistant Examiner*—Sam Paik
*Attorney, Agent, or Firm*—A & J

[57] ABSTRACT

A hot water and electricity generator including a casing having a water inlet provided with a float ball valve, an engine arranged within the casing and having an exhaust pipe, a power generator drivingly connected with the engine, a pump drivingly connected with the power generator, a water reservoir disposed above the power generator within the casing and provided with a heat exchanging pipe, a first electric heater electrically connected to the power generator and installed within the water reservoir, an outlet pipe having an end connected with another end of the heat exchanging pipe and another end extending out of the casing, a steam chamber mounted on the water reservoir, and a second electric heater electrically connected to the power generator and installed with the steam chamber, whereby hot water and electricity will be generated as desired.

2 Claims, 4 Drawing Sheets

1

HOT WATER AND ELECTRICITY GENERATOR

BACKGROUND OF THE INVENTION

1. Field of the Invention

This invention relates to a hot water and electricity generator.

2. Description of the Prior Art

The most commonly used water heater is operated by electric energy and so it will become useless without power supply. Hence, in case of power failure in snowy days, no hot water and electricity will be supplied thereby causing much inconvenience. Accordingly, various kinds of power generators have been developed to provide electricity in the event of power interruption. However, none of them are satisfactory in use and can supply hot water.

Therefore, it is an object of the present invention to provide a hot water and electricity generator which can obviate and mitigate the above-mentioned drawbacks.

SUMMARY OF THE INVENTION

This invention relates to a hot water and electricity generator.

It is the primary object of the present invention to provide a hot water and electricity generator which is convenient to use.

It is another object of the present invention to provide a hot water and electricity generator which is of a high efficiency.

It is still another object of the present invention to provide a hot water and electricity generator which is simple in construction.

It is still another object of the present invention to provide a hot water and electricity generator which is safe in use.

It is a further object of the present invention to provide a hot water and electricity generator which is low in cost.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
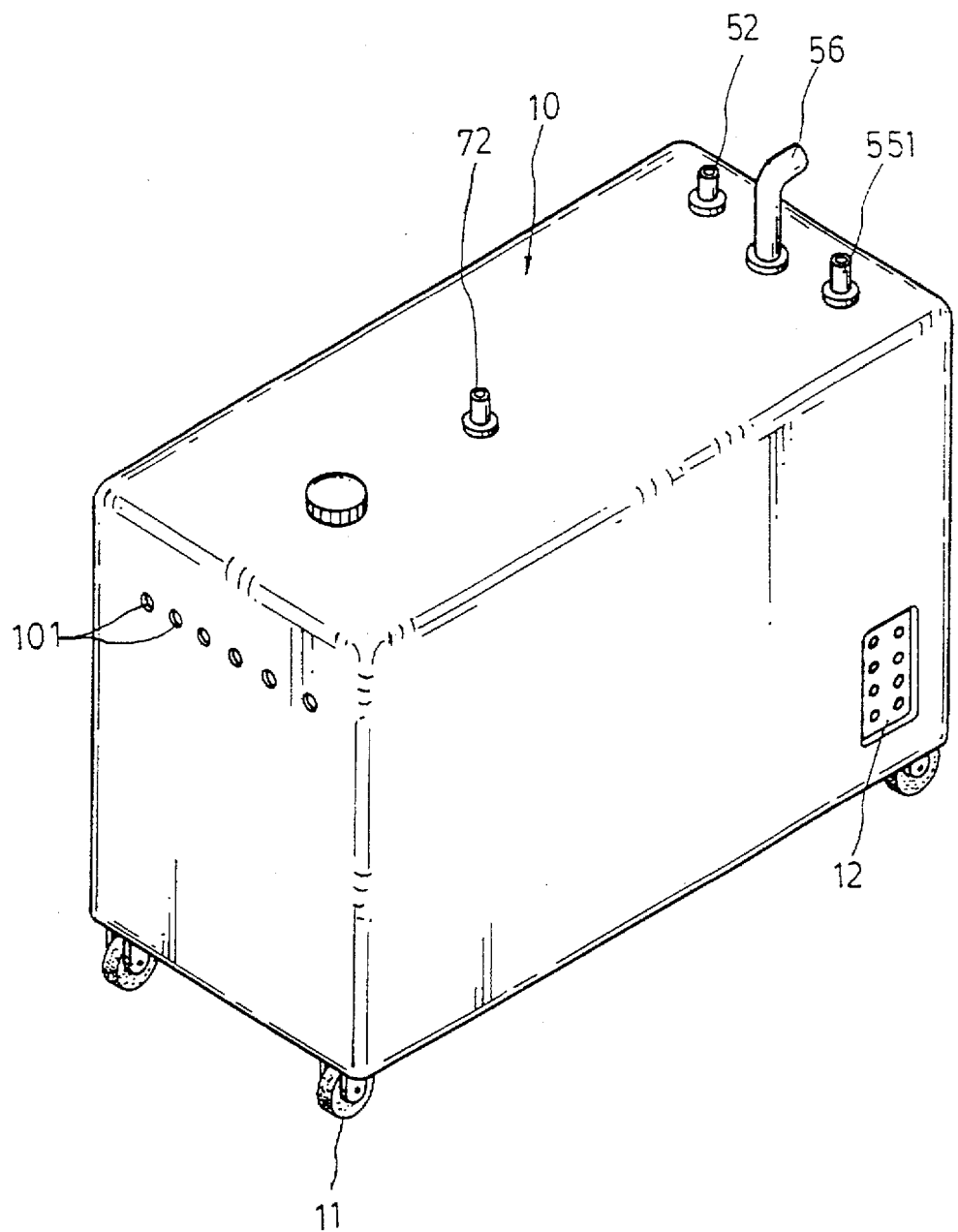
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
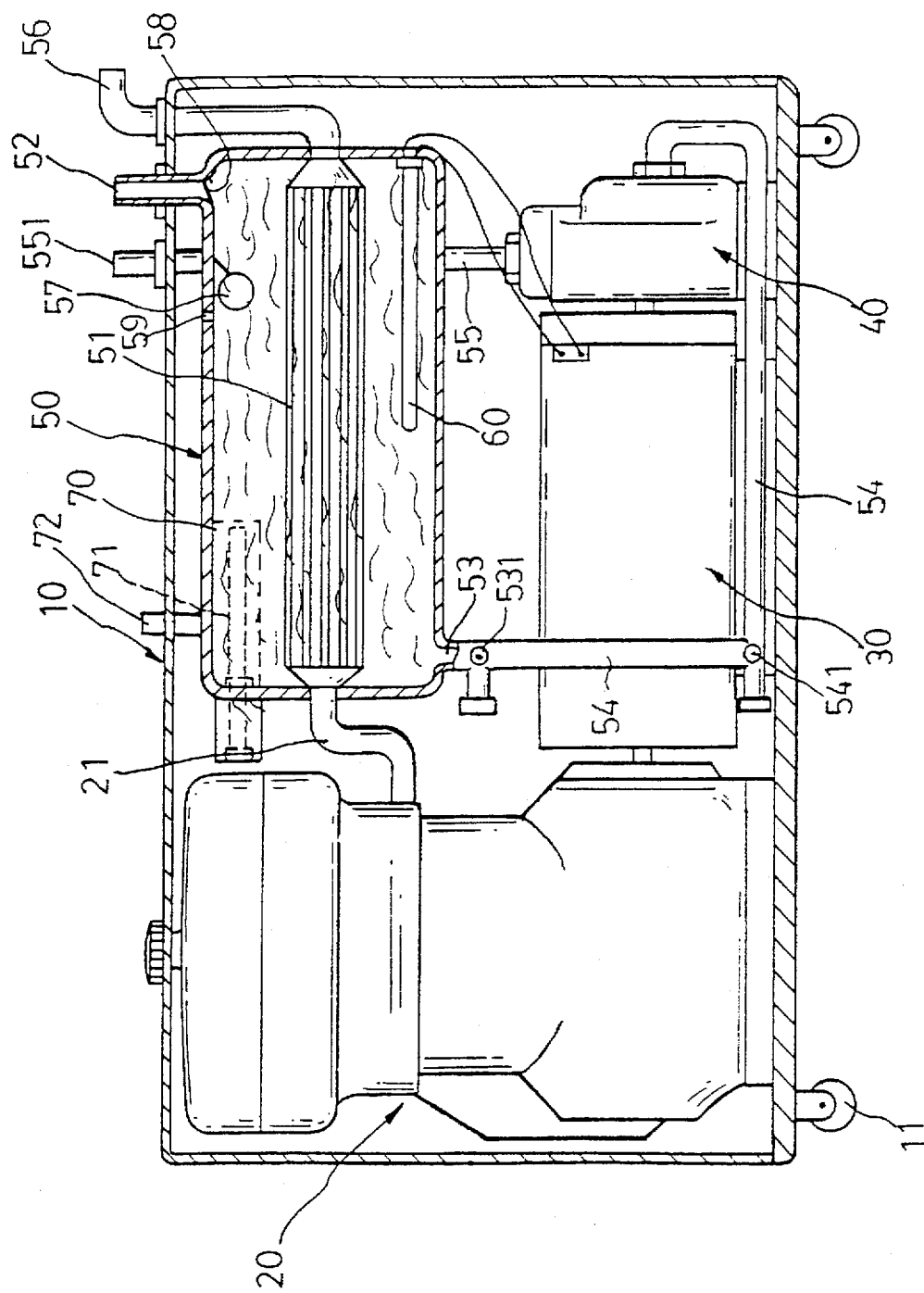
FIG. 2 is a sectional view of the present invention.

With reference to the drawings and in particular to FIGS. 1 and 2 thereof, the hot water and electricity generator according to the present invention mainly comprises a casing 10, an engine 20, a power generator 30, a pump 40 and a water reservoir 50.

The casing 10 is formed with a plurality of ventilation holes 101 at one vertical side wall, four castors 11 at the bottom, and an electrical receptacle 12 at a suitable position.

The engine 20 is arranged within the casing 10, which may be of any conventional design well known to those skilled in the art and is not considered a part of the invention.

The power generator 30 is mounted within casing 10 and drivingly connected with an output axle of the engine 20.

The pump 40 is also disposed within the casing 10 and drivingly connected with an output axle of the power generator 30.

Figure 3:
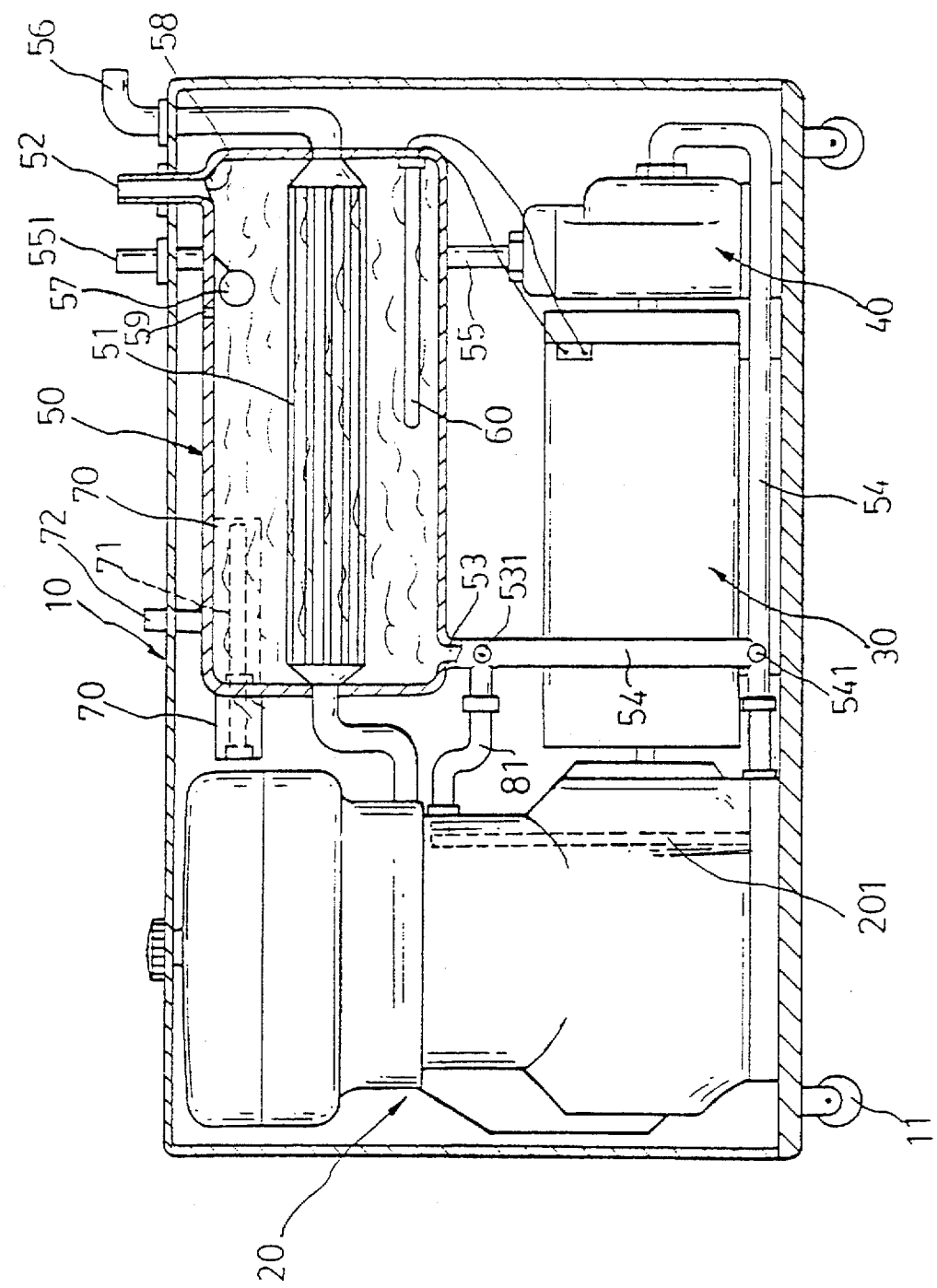
FIG. 3 is a sectional view of a second preferred embodiment of the present invention.
Figure 4:
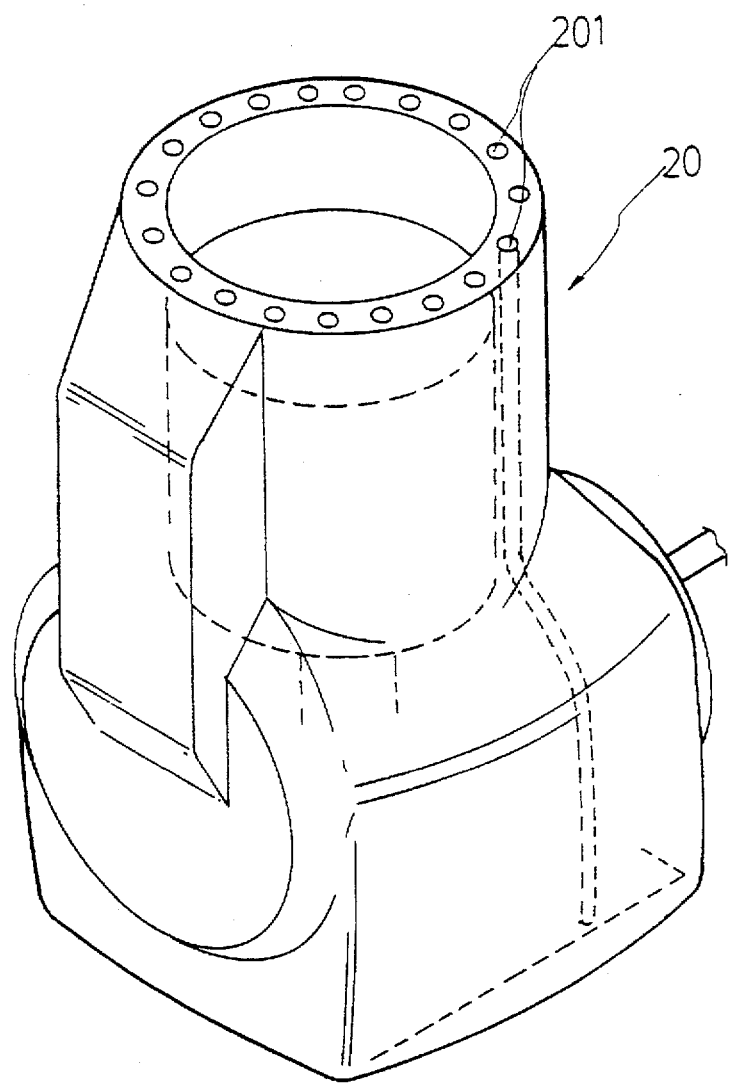
FIG. 4 illustrates the passages of the water-cooled engine.

The water reservoir 50 is a container installed above the power generator 30 and the pump 40. A heat exchanging pipe 51 comprising a plurality of small tubes is fitted within the water reservoir 50, which is connected with an exhaust pipe 21 of the engine 20 at one end and with an outlet pipe 56 at the other. The outlet pipe 56 extends upwardly out of the casing 10. The water reservoir 50 has a water inlet 52 at the top and a water outlet 53 at the bottom. The water inlet 52 is provided with a valve 58. The water outlet 53 is provided with a change valve 531 which is in turn connected to a pipe 54. The pipe 54 is also provided with a change valve 541 and is in turn connected to an inlet of the pump 40. Furthermore, the passages 201 of the cooling water of the engine 20 are connected to the pipe 54 via a branch pipe 81 (see FIGS. 3 and 4). The pump 40 is connected to the water reservoir 50 via a pipe 55 having an outlet 551 extending out of the casing 10. An electric heater 60 is mounted within the water reservoir 50 and located close to the bottom thereof. The heater 60 is electrically connected to the power generator 30. An independent steam chamber 70 is attached to the outside of the water reservoir 50, within which is mounted an electric heater 71. The steam chamber 70 has an outlet 72 extending out of the casing 10. A float ball 57 is operatively connected with the valve 58 so that when the water in the water reservoir 50 reaches a predetermined level, the float ball 57 will close the valve 58 thereby preventing water from filling into the water reservoir 50. The top of the water reservoir 50 has a hole 59 for letting out any steam produced from the water therein.

As the engine 20 is started, the power generator 30 is driven to produce electricity. In the meantime, the exhaust gas of the engine 20 flows out of the exhaust pipe 21 into the heat exchanging pipe 51 thereby exchanging its heat with the water in the heat exchanging pipe 51 and therefore heating the water (see FIG. 2). On the other hand, the electricity produced by the power generator 30 activates the heater 60 to raise the temperature of the water. Then, the hot water in the water reservoir 50 is forced out through the outlet 551 of the pipe 55 of the pump 40 for use. Further, the water from the water reservoir 50 flows through the engine 20 via the passages 201 to exchange heat with the engine 20 and the engine oil reservoir (not shown).

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A hot water and electricity generator comprising:

a casing having a water inlet provided with a float ball valve;

an engine arranged within said casing and having an exhaust pipe;

a power generator drivingly connected with said engine;

a pump drivingly connected with said power generator;

a water reservoir disposed above said power generator within said casing and provided with a heat exchanging pipe, said water reservoir being in communication with said pump;

a first electric heater electrically connected to said power generator and installed within said water reservoir;

said exhaust pipe connected with an end of said heat exchanging pipe;

an outlet pipe having an end connected with another end of said heat exchanging pipe and another end extending out of said casing;

a steam chamber mounted on said water reservoir; and a second electric heater electrically connected to said power generator and installed with said steam chamber.

2. The hot water and electricity generator as claimed in claim 1, wherein said engine is formed with a plurality of passages which are in communication with said water reservoir.

* * * * *